Sept. 3, 1935.  J. R. RIPPE  2,013,424
VALVE
Filed June 21, 1933
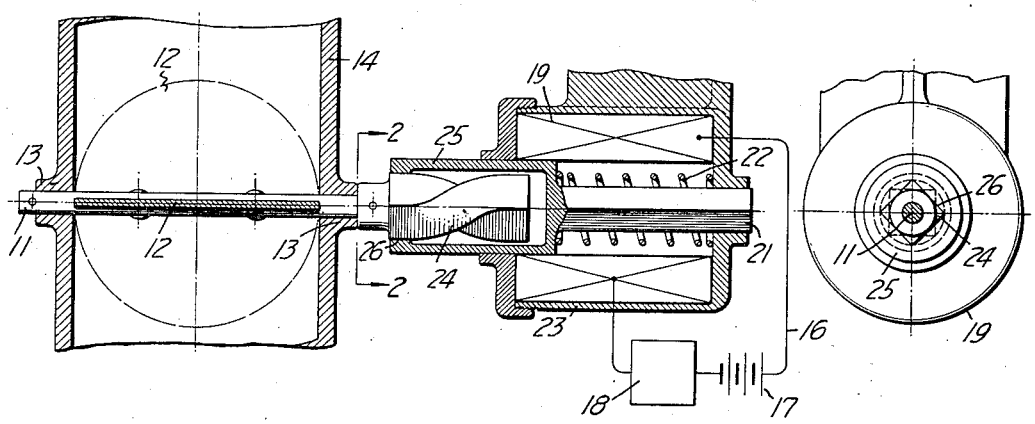
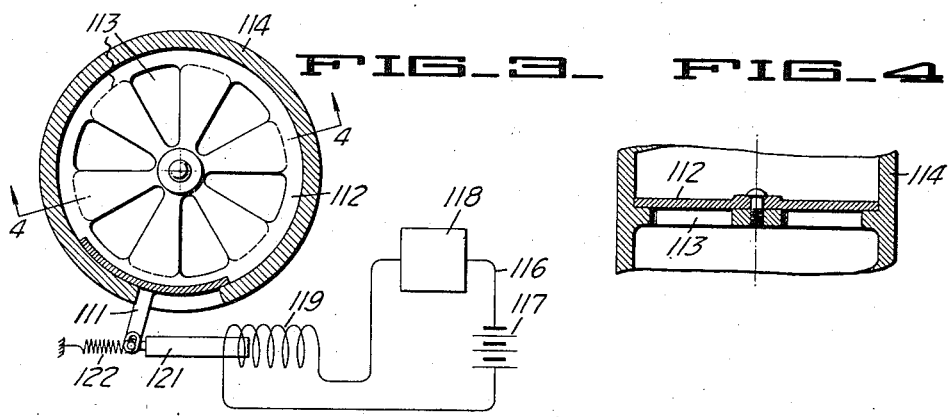
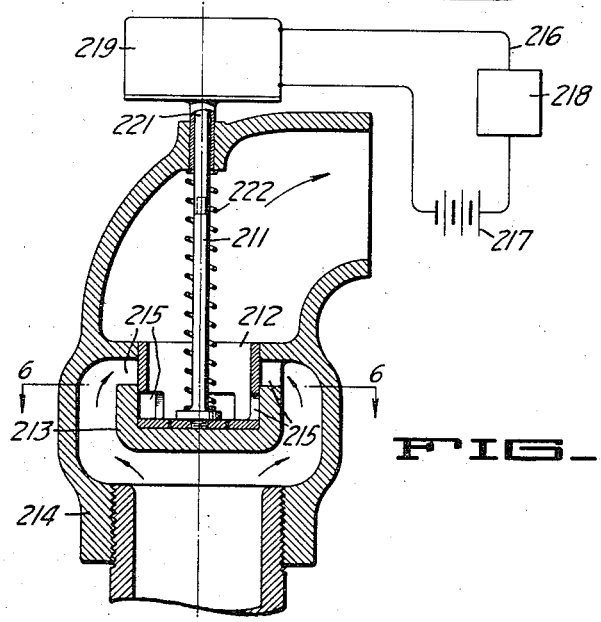
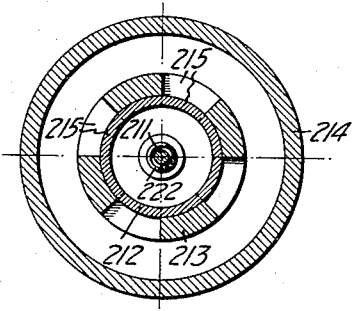
INVENTOR
John R. Rippe
BY
White, Prost, Flehr & Lothrop
ATTORNEYS Patented Sept. 3, 1935

2,013,424

UNITED STATES PATENT OFFICE 2,013,424

VALVE

John R. Rippe, Fresno, Calif.

Application June 21, 1933, Serial No. 676,880

1 Claim. (Cl. 236—34)

The invention, in general, relates to means for controlling the flow of fluids in pipes or conduits. More particularly, the invention relates to a thermo-responsive, electrically operated valve.

While the valve of my invention is suitable for use in many fields, I have designed the valve especially for use in controlling the flow of circulating water in an internal combustion engine. Accordingly, I shall describe the valve in such environment.

It is a primary object of the invention to provide an electrically operated valve for controlling the flow of a fluid which is actuated in response to variations in temperature of the fluid.

A further object of the invention is to provide a valve of the aforementioned character which is positive and automatic in action.

A still further object of the invention is to provide a thermo-responsive, electrically operated valve which requires a minimum of attention and repair and which is inexpensive to manufacture and to operate.

The foregoing and other objects of the invention are attained in the embodiments of the invention which are disclosed in the accompanying drawing, in which:

Figure 1 is a sectional elevation of the preferred embodiment of the invention, showing an electrical circuit in which the embodiment is connected.

Figure 2 is a view of the embodiment illustrated in Figure 1, taken on the line 2—2 thereof.

Figure 3 is a sectional elevation of a modification of the embodiment of the invention which is illustrated in Figure 1, together with an electrical circuit in which the modification is connected.

Figure 4 is a view of the modification of Figure 3 and taken on the line 4—4 thereof.

Figure 5 is a sectional elevation of another modified embodiment of the invention, together with its electrical circuit.

Figure 6 is a view of the modification shown in Figure 5 and taken on the line 6—6 thereof.

In its preferred form, the valve of my invention for controlling fluid flow in a conduit preferably comprises a movable shaft, a member on said shaft for allowing and preventing fluid flow in the conduit, together with means for moving said shaft in response to variations in the temperature of the fluid.

As illustrated in Figure 1 of the drawing, the preferred form of the valve of my invention comprises a butterfly type valve which includes a rotatable shaft 11 upon which a disc 12 is rigidly secured. The shaft is journaled in bearings 13 provided on a pipe or conduit 14 which may be the return pipe of the conventional water cooling system of an internal combustion engine leading from the water jacket surrounding the engine, to the radiator, or which may be the intake pipe running from the radiator to the water jacket surrounding the engine, and in either case ahead of or behind the water pump if one is used. The disc 12 is mounted on that portion of the shaft 11 which extends within the conduit, and is formed to such dimensions as effectively to shut off fluid flow in the conduit when the valve is closed.

In accordance with the invention, I provide an electrical circuit 16 which includes a source of power 17, such as the storage battery of an automotive vehicle, as well as a thermostatic switch element 18. The thermostat may take any desired form, such as a bellows which is expanded and contracted in accordance with the increase or decrease in volume of a fluid, such as mercury, contained in a chamber formed in the bellows, the expansion and the contraction of the bellows making and breaking the electrical circuit 16. Conveniently, the thermostatic switch 18 is mounted on the conduit 14 or, if desired, on the water jacket surrounding the engine in connection with which the valve is to be employed. Or, the switch may be placed in a position on or near the water jacket of the engine, or on the intake or outlet pipe of the water cooling system of the engine, so that the switch will effectively control the valve and hence the fluid flow in the pipe or conduit 14 in response to predetermined temperatures of the fluid or of the engine. Interposed in the electrical circuit 16 is a solenoid 19 in which a plunger 21 is slidably but not rotatably mounted, the plunger being drawn into the solenoid against the action of a spring 22 which is coiled about the plunger, as illustrated. The plunger preferably is formed to a square or rectangular cross-section and is snugly but slidably fitted into an opening of similar size and shape formed in the casing 23 of the solenoid. The exposed extremity 25 of the plunger is formed to a hollow cylindrical shape with a square or rectangular mouth 26, and this extremity may be integral with the remainder of the plunger or it may be a separate piece secured thereto. The fit between the inner extremity of the plunger and the casing 23 effectively prevents rotation of the plunger as well as of its attached hollow cylindrical extremity 25. Energization of the solenoid upon a closing of the circuit draws the plunger 21 within the solenoid against the action of spring 22 which bears at its one end against the casing 23 of the solenoid and at its other end against the hollow cylindrical extremity 25 of the plunger. Upon a breaking of the circuit and consequent de-energization of the solenoid, the hollow cylindrical extremity 25 of the plunger is forced from within the solenoid by the spring 22.

To effect rotation of the shaft 11 and movement of the disc 12 to cause a shutting off or to allow flow of fluid in conduit 14, I mount the solenoid 19 adjacent the conduit so that the outer square-mouth extremity 25 of the plunger is in constant slidable engagement with the square-shaped, twisted extremity 24 of the shaft 11. Preferably, the extremity 24 of the shaft is given a one-quarter turn. When the plunger 21 is drawn within the solenoid, the shaft 11 is rotated by the movement of the edges of the mouth 26 of the plunger over the square twisted extremity 24 of the shaft, thereby moving the disc 12 from a closed position to an open position, or vice versa, depending upon the arrangement between the thermostatic element of the switch 18 and the contacts thereof for making and breaking the circuit 16. Conversely, a retraction of the plunger 21 from the solenoid causes rotation of the shaft 11 in the reverse direction to return the disc 12 to its initial position. In the embodiment of the invention which is illustrated in Figure 1 of the drawing, the arrangement of the thermostatic element of the switch 18 is such that the circuit 16 is closed and the solenoid 19 energized when the temperature of the fluid in the conduit 14 exceeds a predetermined value, and the disc 12 consequently is moved, by the sliding action of the square-mouthed hollow cylinder 25 at the end of the square twisted end 24 of the shaft 11, to a position which allows free movement of fluid in the conduit 14 or free circulation of the water in the water cooling system of the engine should the valve be installed in the return or the intake pipe of the cooling system of an engine. Conversely, the circuit 16 is broken and the solenoid de-energized when the temperature of the fluid in the pipe 14 falls below the predetermined value, and the disc 12 is moved, by the sliding action of the square-mouthed hollow cylinder 25 at the end of the plunger 21 of the solenoid upon the square twisted end 24 of the shaft 11, to a position which shuts off fluid flow in the line 14. While I have shown that the outer extremity of the shaft 11 is square and twisted, it is apparent that a separate twisted square or rectangular piece of stock can be provided and secured by any suitable means to the shaft 11, rather than twisting the square extremity 24 of the shaft 11 itself.

In Figure 3 of the drawing I have illustrated an oscillatory disc type valve which includes a rod or stem 111 which is attached to the periphery of and is for oscillating an apertured disc 112 superposed upon and held in contact with a stationary, similarly apertured disc 113 by means of a pin or screw passing through the center of the two discs. The apertured disc 113 is supported in a conduit 114. Oscillation of the disc 112 places the apertures of the two discs into and out of registry effectively to allow fluid flow and to shut off fluid flow, respectively, in the conduit. The rod 111 pierces the conduit 114 in a slot of such dimensions as to permit the proper distance of operation of the oscillating disc 112, and extends below the conduit an appreciable distance.

The means which I provide in this modification of my invention for oscillating the rod or valve stem 111 are similar to those utilized with respect to the embodiment shown in Figure 1 of the drawing, and include an electrical circuit 116 having a source of power 117 and a thermostatic switch element 118 which conveniently is mounted upon the conduit 114 or upon the engine, in such a position that the heat of the engine affects the thermostatic switch. I also provide a solenoid 119 having a slidable plunger 121 which is mounted adjacent the conduit 114, the plunger being flexibly connected to the valve stem 111. The plunger 121 is drawn into the solenoid upon a closing of the circuit against the action of a spring 122 which is fastened to the outer end of the valve stem 111 and anchored to the conduit 114 or to an adjacent support. This movement of the plunger 121 causes an oscillation of the disc 112 so as to place the apertures therein in registry with the apertures in the disc 113 and hence allow free circulation of the fluid in the conduit 114. Upon a breaking of the circuit and a de-energization of the solenoid 119, the rod or valve stem 111 is moved in the opposite direction by the action of the spring 122 to place the apertures of the discs 112 and 113 out of registry and hence shut off fluid flow in the conduit 114.

Another modification of the valve of my invention is illustrated in Figure 5 of the drawing, which comprises a cup valve including a valve stem 211 connected at its one end to a cup member 212 co-operating with a cup member 213 formed within a conduit 214 to effect an opening or a closing of the valve. The valve stem 211 pierces the conduit 214 and extends above the same. Each of the cup members 212 and 213 is provided with apertures 215 which are placed in registry to open the valve and allow free circulation of fluid in the conduit, and moved out of registry to close the valve or shut off flow of fluid in the conduit.

The opening and closing of the valve is effected by means of an electrical circuit 216 having a source of power 217 and controlled by thermo-responsive switch element 218, as in the modifications hereinabove described. A solenoid 219 is interposed in the circuit 216, mounted in a fixed position at the top of the valve, and is provided with a slidable plunger 221 which is connected to the exposed extremity of the valve stem 211. If desired, the valve stem 211 and the plunger 221 of the solenoid can be integral rather than two separate pieces connected together. The plunger 221 is drawn within the solenoid 219 against the action of a spring 222, similarly to the action of the embodiment of my invention illustrated in Figure 1 and described hereinabove. In operation, upon a closing of the circuit 216 and energization of the solenoid 219, which takes place when the temperature of the fluid in the conduit 214 exceeds a predetermined value, the plunger 221 is drawn within the solenoid and lifts the cup member 212 to place the apertures therein in registry with the apertures of the valve cup member 213 and hence opens the valve to permit free flow of fluid in the conduit. Upon a breaking of the circuit 216, which occurs when the temperature of the fluid in the conduit falls below the predetermined value, the reverse movement takes place and the plunger 221, through the action of the spring 222, causes a seating of the cup member 212 within the cup member 213 and moves the apertures in the two members out of registry, thus closing the valve.

The valves of my invention, as hereinabove described, afford increased efficiency in operation of internal combustion engines inasmuch as the circulation of cooling water is effectively controlled and automatically in response to the temperature of the water. For example, when the engine is cold, the circulation of water is prevented and the engine is given an opportunity to warm up effectively by reason of maintaining the water sealed in the water jacket about the engine. When the water reaches a predetermined value in temperature, the engine is not overheated because the valve in the intake or the return pipe of the system is automatically opened to permit circulation of the water from the radiator, where it is cooled, to the engine and back again.

While I have illustrated the preferred embodiment and two modified embodiments of my invention in the accompanying drawing, it is to be understood that I am not to be limited to the embodiments shown, as my invention, as defined in the appended claim, can be embodied in a plurality and variety of forms.

I claim:

In a system for controlling the flow of fluid in a conduit and in response to temperature variations of the fluid, a butterfly valve in said conduit, a rotatable shaft carrying said valve and journaled in said conduit, a twisted square extremity on said shaft, an electrical circuit, a solenoid in said circuit, a plunger constrained to sliding movement only in said solenoid; said plunger having a twisted square socket in engagement with said twisted extremity, a spring engaging said plunger for urging said plunger into one extreme position thereof, and means for making said circuit in response to variations in temperature of said fluid to cause sliding of said plunger into said solenoid against the urgency of said spring and consequent rotation of said valve shaft to open said valve.

JOHN R. RIPPE.